(12) United States Patent
Morioka

(10) Patent No.: US 10,834,278 B2
(45) Date of Patent: Nov. 10, 2020

(54) IMAGE FORMING APPARATUS PERFORMING NOTIFICATION BY VOICE, STORAGE MEDIUM STORING CONTROL PROGRAM, AND CONTROL METHOD

(71) Applicant: SHARP KABUSHIKI KAISHA, Sakai (JP)

(72) Inventor: Hirohito Morioka, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/536,323

(22) Filed: Aug. 9, 2019

(65) Prior Publication Data

US 2020/0053238 A1 Feb. 13, 2020

(30) Foreign Application Priority Data

Aug. 10, 2018 (JP) ................ 2018-152001

(51) Int. Cl.
*G06F 3/12* (2006.01)
*H04N 1/00* (2006.01)
*G06F 3/16* (2006.01)

(52) U.S. Cl.
CPC ......... *H04N 1/00488* (2013.01); *G06F 3/165* (2013.01); *H04N 1/00323* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2004/0067073 A1* | 4/2004 | Cannon | ............ | G03G 15/5016 399/81 |
| 2005/0069336 A1* | 3/2005 | Kotani | ............ | H04N 1/00405 399/81 |
| 2013/0329245 A1* | 12/2013 | Nishida | ............ | G06F 3/1288 358/1.14 |

FOREIGN PATENT DOCUMENTS

JP 2003-058360 A 2/2003

* cited by examiner

*Primary Examiner* — Henok Shiferaw
(74) *Attorney, Agent, or Firm* — ScienBiziP, P.C.

(57) ABSTRACT

An image forming apparatus includes a CPU and a speaker, and the CPU selects a voice message for output, which corresponds to information to be notified to a person who uses the image forming apparatus, in accordance with a situation of the image forming apparatus, sets, as an output volume value, a normal volume value allocated to the message for output, and when determining that a person exists around the image forming apparatus in accordance with an output of a person detection sensor, determines whether to change the output volume value, and when determining that the output volume value is to be changed, changes the output volume value in accordance with a content of the voice message for output. Then, the voice message for output is output from the speaker with a volume according to the output volume value.

8 Claims, 13 Drawing Sheets

FIG. 7

| ID | NORMAL VOLUME | VOLUME IN PRESENCE OF PERSON | MESSAGE CONTENT |
|---|---|---|---|
| 1 | LARGE | SMALL | PAPER IS JAMMED. |
| 2 | LARGE | SMALL | OUT OF TONER. |
| 3 | LARGE | SMALL | FAX IS RECEIVED. |
| 4 | LARGE | LARGE | DOCUMENT IS LEFT. PLEASE CHECK. |
| 5 | SMALL | SMALL | DOCUMENT SIZE IS DETECTED. |
| 6 | LARGE | SMALL | OUT OF PAPER. |
| 7 | ... | ... | |

IMAGE FORMING APPARATUS PERFORMING NOTIFICATION BY VOICE, STORAGE MEDIUM STORING CONTROL PROGRAM, AND CONTROL METHOD

BACKGROUND

1. Field

The present disclosure relates to an image forming apparatus, a storage medium soring a control program, and a control method, and particularly relates to an image forming apparatus that performs notification, for example, by voice, a storage medium storing a control program, and a control method.

2. Description of the Related Art

An example of an image forming apparatus of a related art is disclosed in Japanese Unexamined Patent Application Publication No. 2003-058360. Japanese Unexamined Patent Application Publication No. 2003-058360 discloses a voice guidance method of performing notification of a state of a printing apparatus by voice, in which a volume of voice to be reproduced is changed in accordance with a content of a voice message to be notified, specifically, importance, urgency, or the like of the message.

However, the image forming apparatus of the related art has a problem that, when the volume of the voice is small, it is difficult for a person apart from the apparatus to hear the voice, and has a problem that, when the volume of the voice is large, the voice is harsh for a person near the apparatus because the volume is too large.

Therefore, the disclosure principally provides an image forming apparatus, a control program, and a control method that are new.

The disclosure also provides an image forming apparatus, a control program, and a control method that are able to perform notification by voice with an appropriate volume in accordance with a situation around the apparatus.

SUMMARY

An aspect of the disclosure is an image forming apparatus including an output unit that outputs voice, and the image forming apparatus includes: a notification unit, a volume setting unit, a person detection unit, and a volume change unit. The notification unit causes the output unit to output, among a plurality of messages indicating information about use of the image forming apparatus, a message for output, which is selected in accordance with a using situation of the image forming apparatus, by voice. The volume setting unit sets, in accordance with a content of the message for output, a volume when the message for output is output by voice. The person detection unit detects whether a person exists in a predetermined region that is set to the image forming apparatus. The volume change unit changes, in accordance with a detection result of the person detection unit, the volume set by the volume setting unit.

An aspect of the disclosure is a storage medium storing a control program executed by an image forming apparatus including an output unit that outputs voice, and the control program causes a processor of the image forming apparatus to execute: causing the output unit to output, among a plurality of messages indicating information about use of the image forming apparatus, a message for output, which is selected in accordance with a using situation of the image forming apparatus, by voice; setting, in accordance with a content of the message for output, a volume when the message for output is output by voice; detecting whether a person exists in a predetermined region that is set to the image forming apparatus; and changing, in accordance with a detection result of the detecting, the volume set by the setting.

An aspect of the disclosure is a control method of an image forming apparatus including an output unit that outputs voice, and the control method includes: causing the output unit to output, among a plurality of messages indicating information about use of the image forming apparatus, a message for output, which is selected in accordance with a using situation of the image forming apparatus, by voice; setting, in accordance with a content of the message for output, a volume when the message for output is output by voice; detecting whether a person exists in a predetermined region that is set to the image forming apparatus; and changing, in accordance with a detection result of the detecting, the volume set by the setting.

BRIEF DESCRIPTION OF THE DRAWINGS

FIG. 7 illustrates an example of a volume table in a modified example;

DESCRIPTION OF THE EMBODIMENTS

Figure 1:
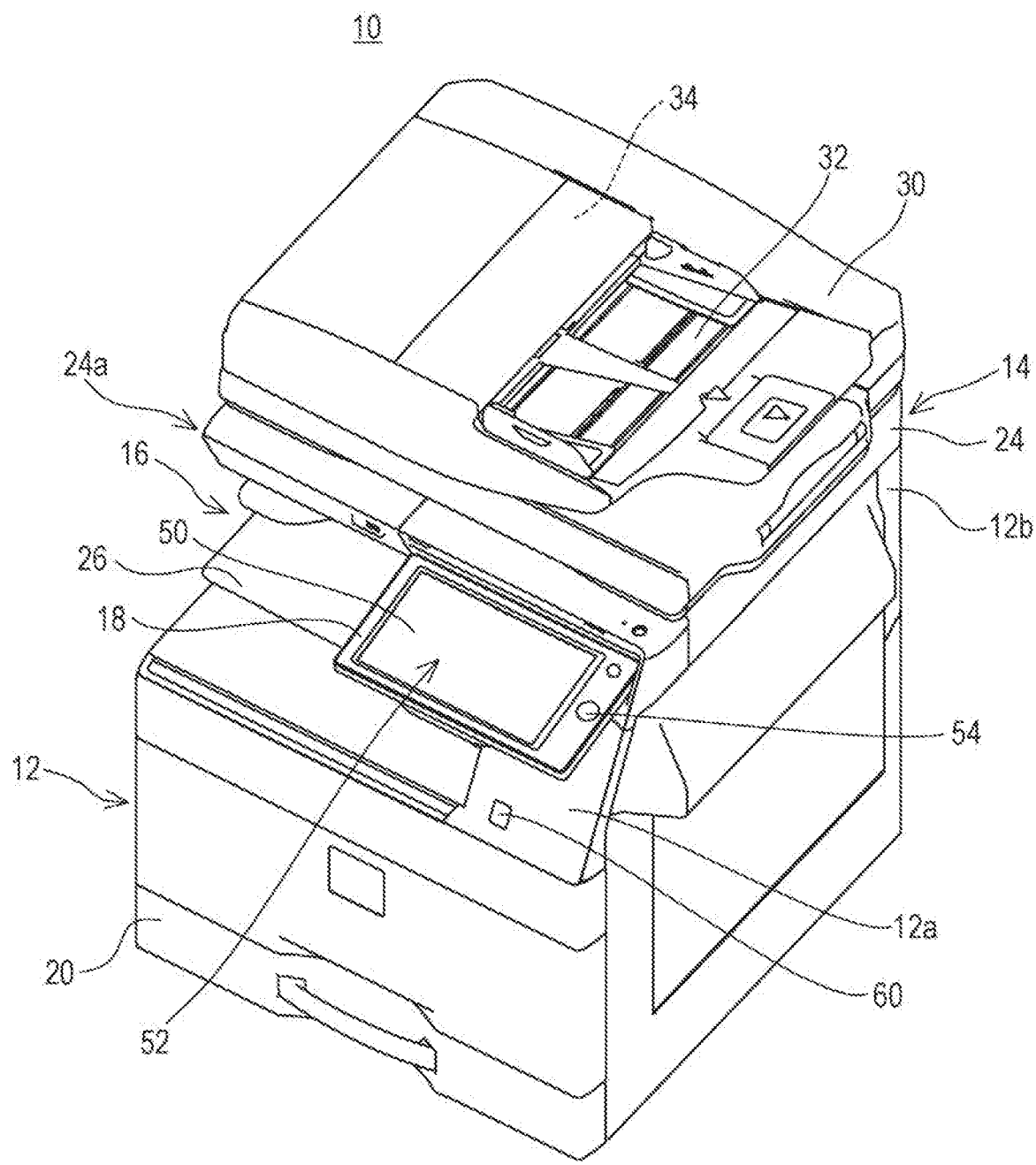
FIG. 1 is a perspective view illustrating an example of an appearance configuration of an image forming apparatus that is an embodiment of the disclosure, as viewed from obliquely above.

FIG. 1 is a perspective view illustrating an example of an appearance configuration of an image forming apparatus 10 of an embodiment, as viewed from obliquely above. With reference to FIG. 1, the image forming apparatus 10 which is an embodiment of the disclosure is an image forming apparatus of an in-body paper discharge type that an in-body paper discharge unit 16 is formed between an image forming unit 12 and an image reading unit 14, and the image forming apparatus 10 includes an operation unit 18 provided as a separate unit in a front surface side of the image reading unit 14. As described later, the image forming apparatus 10 forms, on the basis of image data read by the image reading unit 14 or the like, a multicolor or monochromatic image on a predetermined sheet (recording medium), and discharges the sheet formed with the image to the in-body paper discharge unit 16. In the embodiment, the image forming apparatus 10 is a multifunction peripheral (MFP) that has a copy function, a printer function, a scanner function, a facsimile function, and the like.

Note that, in the embodiment, a front-back direction (depth direction) for the image forming apparatus 10 and its components is defined on the assumption that a surface facing a standing position of a user, that is, a surface in a side provided with the operation unit 18 is a front surface (front side), and a left-right direction (lateral direction) for the image forming apparatus 10 and its components is defined on the basis of a state where the image forming apparatus 10 is viewed from the user.

First, a basic configuration of the image forming apparatus 10 will be described. As illustrated in FIG. 1, the image forming apparatus 10 includes the image forming unit 12 and the image reading unit 14 which is provided above the image forming unit 12.

A housing of the image forming unit 12 includes a first coupling housing 12a formed in a right side upper part and a second coupling housing 12b formed in a back side upper part, and the image reading unit 14 is supported by the first coupling housing 12a and the second coupling housing 12b. Accordingly, the in-body paper discharge unit 16 that is an in-body space where a sheet formed with an image is stored is formed in a lower side of the image reading unit 14. The in-body paper discharge unit 16 is provided with a discharge tray 26 that receives a paper formed with an image and discharged through a discharge port (not illustrated).

The image forming unit 12 includes an exposure unit, a developer, a photosensitive drum, a charger, an intermediate transfer belt, a transfer roller, a fixing unit, and the like. The image forming unit 12 forms an image with an electrophotographic system on a sheet that is fed from a paper feed cassette 20 or the like arranged below the image forming unit 12. That is, the image forming unit 12 forms an electrostatic latent image according to image data on the photosensitive drum by the charger, the exposure unit, and the like and visualizes the electrostatic latent image on the photosensitive drum with toner by the developer. Further, a toner image formed on the photosensitive drum is transferred onto the sheet by the intermediate transfer belt, the transfer roller, and the like, and the toner image transferred to the sheet is thermally fixed by the fixing unit. After that, the sheet formed with the image is discharged to the in-body paper discharge unit 16 (discharge tray 26) through the discharge port formed in the first coupling housing 12a. Note that, image data used to form the image on the sheet is image data that is read by the image reading unit 14, image data that is transmitted from an external computer, or the like.

The image reading unit 14 includes a housing 24 that has a document platen, which is formed of a transparent material, on its upper surface. In the housing 24, a light source, a plurality of mirrors, an image forming lens, a line sensor, and the like are provided. The image reading unit 14 exposes a surface of a document with use of the light source and guides reflected light, which is reflected from the surface of the document, to the image forming lens by the plurality of mirrors. Then, an image of the reflected light is formed on a light receiving element of the line sensor by the image forming lens. In the line sensor, luminance and chromaticity of the reflected light whose image is formed on the light receiving element are detected and image data based on an image of the surface of the document is generated. As the line sensor, a charge coupled device (CCD), a contact image sensor (CIS), or the like is used.

On a top surface of the image reading unit 14, a document pressing cover 30 is attached via a hinge or the like, which is arranged in a back side, so as to be freely opened and closed. The document pressing cover 30 is provided with an automatic document feeder (ADF) 34 that automatically feeds a document, which is placed on a document placing tray 32, one by one to an image reading position in the image reading unit 14.

Further, the housing 24 of the image reading unit 14 has a housing projection portion 24a that is projected frontward as compared with a front surface of the document pressing cover 30. That is, a front end portion of the housing 24 is projected frontward as compared with the front surface of the document pressing cover 30. Then, the operation unit 18 is provided in a front surface side of the housing 24 of the image reading unit 14.

Further, a person detection sensor 60 is provided in a front surface of the first coupling housing 12a. As the person detection sensor 60, a human detecting sensor that detects presence or absence of a person by detecting, with use of a pyroelectric sensor (infrared sensor), a temperature change when one having a temperature difference from am ambient temperature moves in a detection range is usable.

Note that, a position where the person detection sensor 60 is provided is an example and the person detection sensor 60 may be provided in a front surface of the housing projection portion 24a.

Moreover, as the person detection sensor 60, a distance sensor using laser or an ultrasonic wave, or a digital camera (image sensor) using a CCD or a CMOS is also usable. When the distance sensor is used, an object in a predetermined detection range is able to be detected by a change of a distance, and when the image sensor is used, a motion of the object in the predetermined detection range is able to be detected by a change (motion) of an image.

Further, in another example, a floor sensor (pressure sensor) connected to the image forming apparatus 10 is also usable as the person detection sensor 60. In this case, the floor sensor is provided in a range (corresponding to a predetermined region) of a floor surface, which corresponds to a person detection range A (refer to FIG. 3) that is set around the image forming apparatus 10 (near the image forming apparatus 10), and the image forming apparatus 10 (CPU 70) determines whether a person (user) exists in a range of the person detection range A in accordance with an output of the floor sensor.

Moreover, although illustration will be omitted, a control unit that controls operations of respective components of the image forming apparatus 10 is provided at a predetermined position of the image forming apparatus 10. The control unit includes the CPU 70, a memory (74, 88), a communication circuit 92, and the like which are described below, and controls the respective components of the image forming apparatus 10 in accordance with an input operation or the like to the operation unit 18 by the user so as to make the image forming apparatus 10 perform various operations and transmit or receive data to or from a device that is connected in a communicable manner.

The operation unit 18 is also called an operation device, an operation panel, or the like and is formed in a shape of an oblong rectangular plate. The operation unit 18 is provided to be inclined front-downwardly so that the user easily sees its upper surface (upper surface of the operation panel).

Note that, the operation unit 18 is attached to the housing of the image reading unit 14 rotatably around its upper end portion as an axis.

In the upper surface of the operation unit 18, a display 50, a touch panel 52, and a home button 54 are provided. The home button 54 is provided on a right side of the display 50 and the touch panel 52.

The home button 54 is a hardware key (operation button) using a switch of an electrostatic capacitance system. The home button 54 is a key to display a home screen on the display 50. Note that, the home screen is a screen (basic screen) in which a main menu is displayed, and images of keys to select each of functions of copy, print, facsimile, and scan, and images of keys to display a setting screen in which detailed setting related to each of the functions and other functions is performed are displayed.

Figure 2:
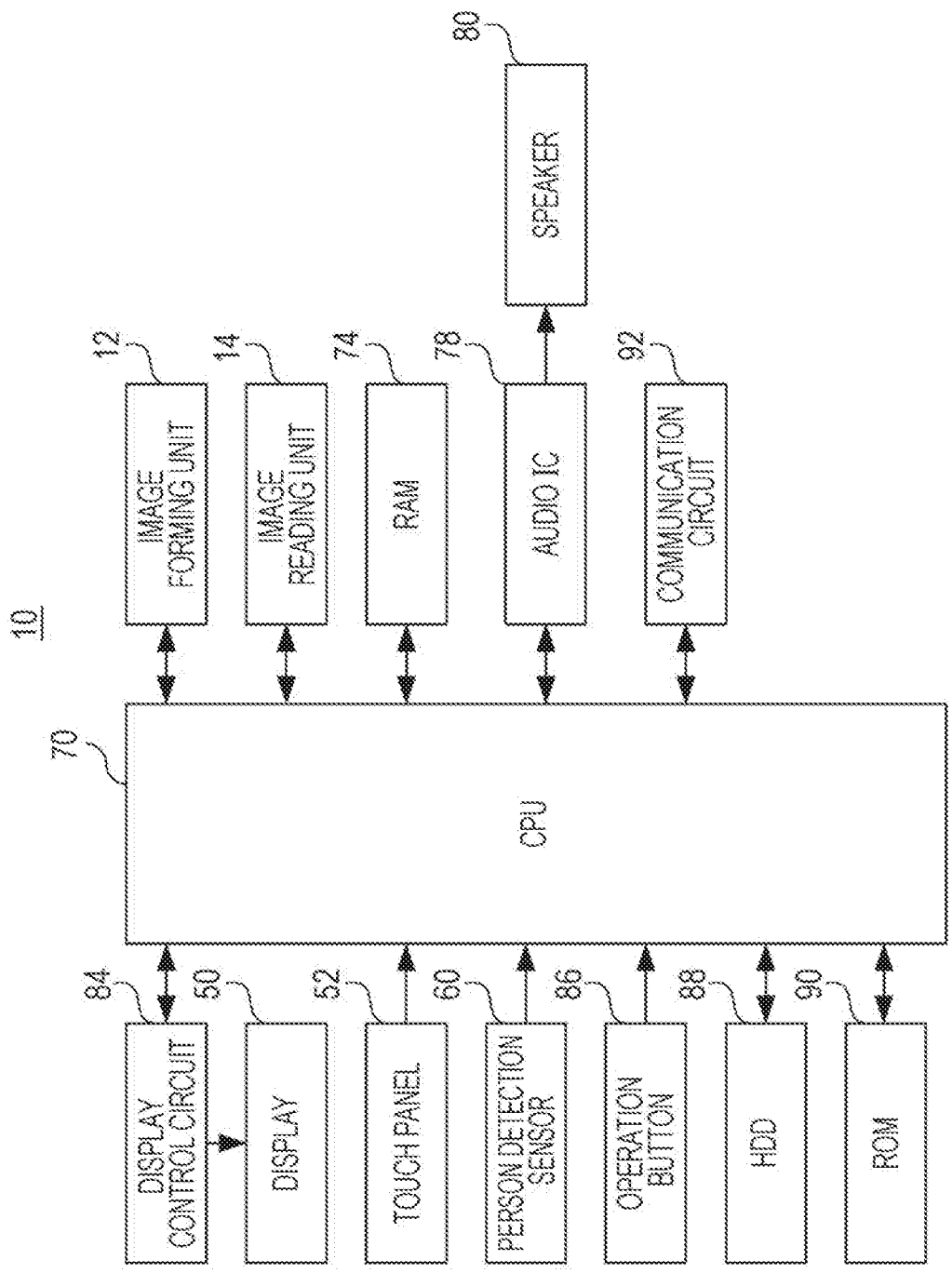
FIG. 2 is a block diagram illustrating an example of an electric configuration of the image forming apparatus illustrated in FIG. 1.

FIG. 2 is a block diagram illustrating an example of an electric configuration of the image forming apparatus 10 illustrated in FIG. 1. Note that, part of components not directly related to the disclosure of the present application will be omitted.

As illustrated in FIG. 2, the image forming apparatus 10 includes the CPU 70. The CPU 70 is connected to the image forming unit 12, the image reading unit 14, the touch panel 52, and the person detection sensor 60 which are described above, and is connected to the RAM 74, an audio IC 78, a display control circuit 84, an operation button 86, the HDD 88, a ROM 90, and the communication circuit 92. Further, the audio IC 78 is connected to a speaker 80 and the display control circuit 84 is connected to the display 50.

The CPU 70 performs overall control of the image forming apparatus 10 in accordance with a program stored in the ROM 90. In addition, the CPU 70 executes notification control processing of the embodiment in accordance with a program stored in the ROM 90. Since the image forming unit 12 and the image reading unit 14 are as described above, duplicate description will be omitted.

The display 50 is a general monitor such as a liquid crystal display (LCD). As the display 50, another general monitor such as an electro-luminescence (EL) display is also usable. On the display 50, various screens such as a home screen which is a screen in which a desired job or operation mode is selected from various jobs that are able to be executed by the image forming apparatus 10, a setting screen in which use/non-use of a function of the image forming apparatus 10 is set and a detailed content of the function to be used is set, and an operation screen by which the image forming apparatus 10 is operated are displayed. In the various screens, a status (operation state) of the image forming apparatus 10, an image of a software key to receive various kinds of setting, a print instruction, or the like from the user, a scanned image (preview image), an image (input image) received (acquired) from an external computer or a storage medium, various messages, and the like are displayed.

Note that, in the embodiment, the job means scan, copy (including scan of a document), print, transmission of a fax, transmission of an electronic mail, or the like.

The touch panel 52 detects a touch operation (touch input) in a touch effective range of the touch panel 52 and outputs touch coordinate data indicating a position of the touch input to the CPU 70. The touch panel 52 is a general touch panel, and a touch panel in any system, for example, such as a capacitive touch panel, an electromagnetic induction touch panel, a resistive film touch panel, or an infrared touch panel is usable. In the embodiment, a capacitive touch panel is used as the touch panel 52 and the touch panel 52 is provided on a display surface of the display 50.

Note that, though the touch panel 52 is provided on the display 50 in the embodiment, a touch panel display in which the display 50 and the touch panel 52 are integrally formed may be provided.

The person detection sensor 60 is a human detecting sensor using an infrared sensor as described above and the CPU 70 detects presence or absence of an object (person, user) existing in a predetermined range on the basis of an output of the person detection sensor 60.

Figure 3:
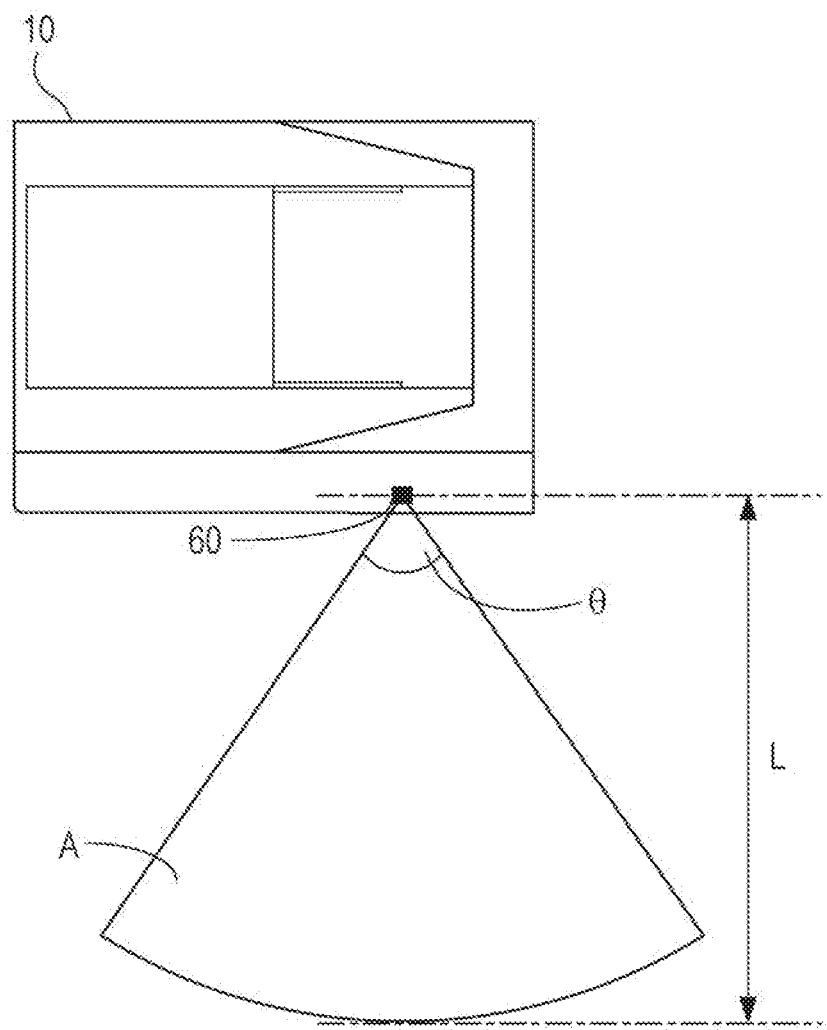
FIG. 3 illustrates an example of a detection range of a person detection sensor provided in the image forming apparatus illustrated in FIG. 1.

FIG. 3 is a plan view for explaining the person detection range A set around the image forming apparatus 10. As illustrated in FIG. 3, the person detection range A is in a front side of the image forming apparatus 10 and is set as a range where existence of a person (user) who is considered to use the image forming apparatus 10 is able to be detected. In an example illustrated in FIG. 3, the person detection range A in a fan shape is set in the front side of the image forming apparatus 10 (operation unit 18). A length L of a radius of the fan is able to be appropriately set in accordance with an environment where the image forming apparatus 10 is installed, but a maximum value thereof is limited by a maximum detection distance of the person detection sensor 60. A central angle $\theta$ of the fan is also able to be appropriately set in accordance with the environment where the image forming apparatus 10 is installed, but a maximum value thereof is limited by a maximum viewing angle of the person detection sensor 60 in a horizontal direction.

Note that, although illustration will be omitted, since the person detection sensor 60 detects a person such as a user, a central angle of the person detection sensor 60 in a vertical direction may be set to such a degree that a floor or a ceiling is not detected in the person detection range A.

With reference back to FIG. 2, the RAM 74 is used as a work area and a buffer area of the CPU 70.

The audio IC 78 reproduces voice data in accordance with an instruction of the CPU 70 and outputs reproduced voice from the speaker 80. Thus, sound or voice (synthesized voice) corresponding to the voice data is output from the speaker 80. Specifically, in accordance with a situation of the image forming apparatus 10, voice (voice message) with a predetermined content corresponding to various kinds of information about use of the image forming apparatus 10 is output from the speaker 80. For example, the various kinds of information about use of the image forming apparatus 10 are information indicating that print is completed, information indicating that a fax is received, information indicating that a document remains on the document platen, information indicating that a size of a document placed on the document placing tray 32 is detected, information indicating out of toner, and information indicating out of paper, and a voice message to notify the user of such information is output from the speaker 80.

The display control circuit 84 includes a GPU, a VRAM, and the like. In accordance with an instruction of the CPU 70, the GPU generates, in the VRAM, display image data, which is used to display various screens on the display 50, by using image generation data 304b (refer to FIG. 4) stored in the RAM 74 and outputs the generated display image data to the display 50. Although detailed description will be omitted, the image generation data includes data such as polygon data and texture data.

The operation button 86 includes various keys and buttons such as the home button 54. The HDD 88 is a main memory of the image forming apparatus 10 and stores various kinds of data. The ROM 90 stores a program executed by the CPU 70 and specific information (a model name, a serial number) of the image forming apparatus 10.

The communication circuit 92 includes a modem and a network interface card (NIC). The modem is a communication circuit to perform transmission or reception of a fax and is connected to a public telephone line. The NIC is a communication circuit to perform communication with another electronic device through a network (LAN and the Internet) and is connected to, for example, the LAN.

Note that, the electric configuration of the image forming apparatus 10 illustrated in FIG. 2 is merely an example and does not need to be limited thereto. For example, the image forming apparatus 10 is provided with a sensor that detects paper jam, or a sensor that detects paper shortage in the paper feed cassette 20 or the like, etc.

In the image forming apparatus having such a configuration, as described above, information about the image forming apparatus is notified to the user by voice in some cases. As such an image forming apparatus, there is an image forming apparatus that, when there are a plurality of pieces of information to be notified and there is a difference of importance or urgency therebetween, a volume of voice to be reproduced is changed in accordance with importance or urgency of information to be notified.

However, a conventional image forming apparatus has a problem that, when a volume of voice to be reproduced is small, it is difficult for a person apart from the apparatus to hear the voice, and has a problem that, when a volume of voice to be reproduced is large, the voice is harsh for a person near the apparatus because the volume is too large.

Thus, the image forming apparatus 10 of the disclosure of the present application is configured so that a volume value in output is changed from a normal volume value, which is set to each of voice messages, in accordance with a content of a voice message and whether a person is around (in a range of the person detection range A of) the image forming apparatus 10.

First Embodiment

A method of setting a volume value when a voice message is output in the present embodiment will be described below. First, among voice messages that are able to be reproduced (output) by the image forming apparatus 10, a voice message for output, which corresponds to information to be notified to a person who uses the image forming apparatus 10, is selected (designated) in accordance with the situation of the image forming apparatus 10. Note that, the person who uses the image forming apparatus 10 includes not only a person who is near the image forming apparatus 10, that is, a person who is in the range of the person detection range A but also a person who is outside the range of the person detection range A but may use the image forming apparatus 10. Note that, the person who may use the image forming apparatus 10 means, for example, a person who is in a room or on a floor where the image forming apparatus 10 is installed.

Note that, a normal volume value (default volume value) is set to each of the voice messages that is able to be output by the image forming apparatus 10. The normal volume value of each of the voice messages is set in accordance with a content of the voice message. Note that, when the volume value is large, the volume when the voice message is output from the speaker 80 is large, and when the volume value is small, the volume when the voice message is output from the speaker 80 is small.

For example, for a voice message to perform notification of an error and a voice message to notify an end of a job, a relatively large value is set as the normal volume value. Specifically, the normal volume value of the voice messages is set to a value by which not only a person in the range of the person detection range A but also a person outside the range of the person detection range A, that is, a person apart from the apparatus is able to recognize each of the voice messages.

On the other hand, for a voice message to make a response to an operation of the user, a relatively small value is set as the normal volume value. That is, as the normal volume value of the voice message to make a response to an operation of the user, a value smaller than at least the normal volume value of the voice message to perform notification of an error or the like is set. Specifically, the value by which a person existing outside the range of the person detection range A is not able to recognize the voice message but a person in the range of the person detection range A is able to recognize the voice message is set.

Then, when a voice message for output is designated, a normal volume value set to the voice message for output is set as a volume value (output volume value) when the voice message for output is output.

Subsequently, when it is determined that a person exists around the image forming apparatus 10, that is, in the range of the person detection range A in accordance with an output of the person detection sensor 60, whether to change, in accordance with a content of the voice message for output, the output volume value is determined.

For example, in a case where a voice message to notify an error, such as paper shortage, toner shortage, or paper jam, which is able to be handled even by a general user is selected as the voice message for output among voice messages to notify an error and a person is in the range of the person detection range A, the output volume value is changed to a volume value smaller than the normal volume value. Further, in a case where a voice message to notify an end of a job such as a print job is selected as the voice message for output and a person is in the range of the person detection range A, the output volume value is changed to a volume value smaller than the normal volume value. This is because, in the case of the voice messages with the contents as described above, from a viewpoint of importance or urgency of the voice messages, when a person is not in the range of the person detection range A, it is requested that each of the voice messages also reaches a place (outside the range of the person detection range A) apart from the image forming apparatus 10, but when a person is in the range of the person detection range A, it is only requested that the person is able to recognize the content of the voice message.

On the other hand, in a case where a voice message with a content having high urgency, such as a voice message to perform notification that removal of a medium including information having high confidentiality, for example, such as a document, a printed sheet, a storage medium such as a USB memory, or the like is forgotten, is selected as the voice message for output among voice messages to perform notification of an error, even when a person is in the range of the person detection range A, the output volume value is not changed to a small volume value. This is because, in the case of the voice message with the content as described above, a notification target is not necessarily a person in the range of the person detection range A, and also from a viewpoint of security, the voice message is to be notified immediately also to the range outside the person detection range A, so that the voice message is to be output with a large volume at all times.

Further, in a case where a voice message to make a response to an operation of the user is selected as the voice message for output, even when a person is in the range of the person detection range A, the output volume value is not changed. As described above, a relatively small value is set as the normal volume value for the voice message to make a response to an operation of the user, or the like. A target of the voice message in this case is a person who operates the image forming apparatus 10, that is, a person in the range of the person detection range A, and it is only requested that the person is able to recognize the voice message and it is not necessary to transmit the voice message to another person. Thus, it is not necessary to change the output volume value in the case of the voice message to make a response to an operation of the user, or the like.

As described above, in a case where a person is not in the range of the person detection range A or even in a case where a person is in the range of the person detection range A, when it is determined that the output volume value is not to be changed, the voice message for output is output from the speaker 80 with a volume according to the output volume value that is set in accordance with the normal volume value.

On the other hand, when it is determined that the output volume value is to be changed, the output volume value is changed in accordance with the content of the voice message for output. Then, the voice message for output is output from the speaker 80 with a volume according to the changed output volume value.

Further, although illustration will be omitted, when the voice message for output is output from the speaker 80, a message with a content corresponding to information indicated by the voice message for output is displayed on the display 50. Thus, by viewing the message displayed on the display 50, a person in the range of the person detection range A, in particular, a person who operates the image forming apparatus 10 is able to visually recognize the information which is indicated by the voice message for output and relates to the image forming apparatus 10.

The aforementioned operation of the image forming apparatus 10 is realized when the CPU 70 of the image forming apparatus 10 executes an information processing program stored in the RAM 74. Specific processing will be described later with reference to a flowchart.

Figure 4:
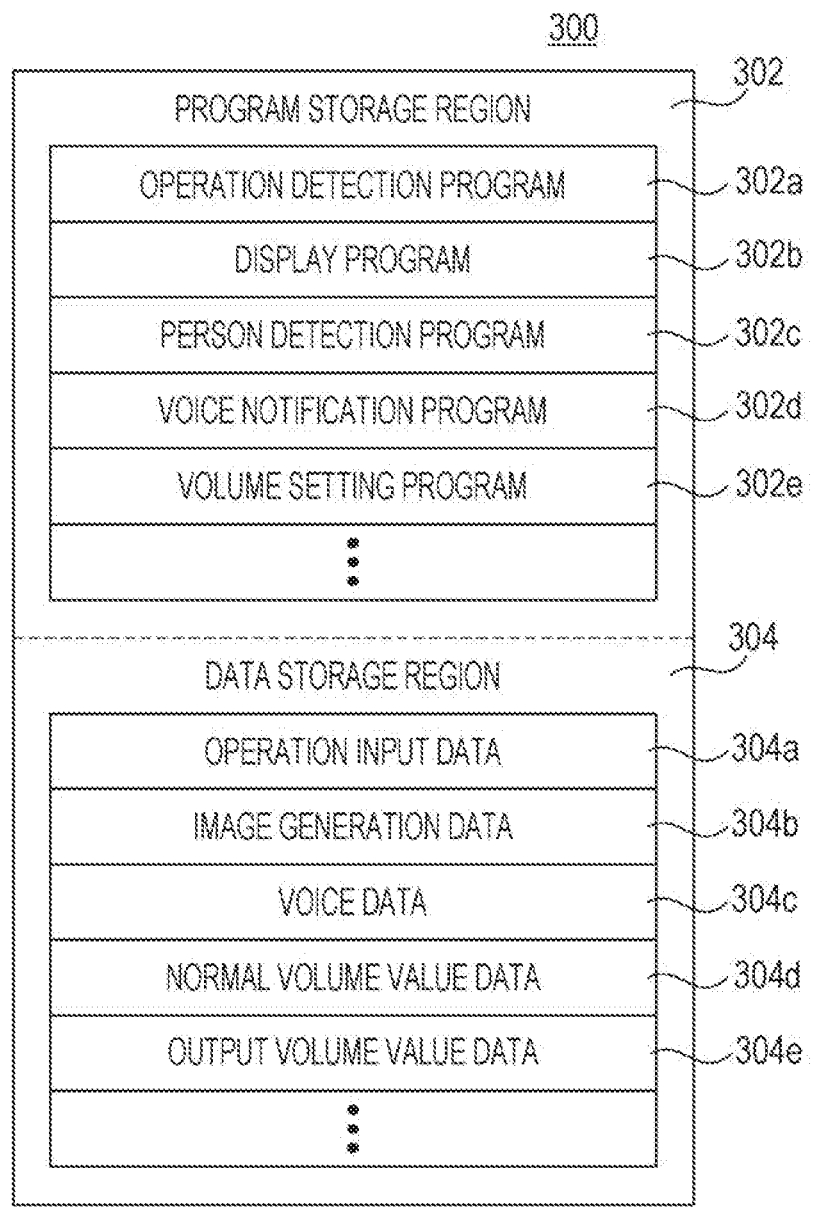
FIG. 4 illustrates an example of a memory map of a RAM connected to a CPU illustrated in FIG. 2.

FIG. 4 illustrates an example of a memory map 300 of the RAM 74 illustrated in FIG. 2. The RAM 74 includes a program storage region 302 and a data storage region 304. The program storage region 302 stores the information processing program executed by the CPU 70, and the information processing program includes an operation detection program 302a, a display program 302b, a person detection program 302c, a voice notification program 302d, a volume setting program 302e, and the like.

The operation detection program 302a is a program by which operation input data that is input in accordance with an operation of the operation button 86 is detected and stored in the data storage region 304.

The display program 302b is a program by which display image data corresponding to various screens such as the home screen is generated and the generated display image data is output to (displayed in) the display 50.

The person detection program 302c is a program by which an object (person, user) exists in the range of the person detection range A that is set around the image forming apparatus 10 is detected.

The voice notification program 302d is a program by which a voice message for output, which corresponds to various kinds of information about use of the image forming apparatus 10, is designated in accordance with the situation of the image forming apparatus 10 and the voice message for output is output from the speaker 80. The voice notification program 302d is also a program by which the voice message for output is output from the speaker 80 with a volume according to an output volume value indicated by output volume value data 304e described later.

The volume setting program 302e is a program by which an output volume value when a voice message is output in accordance with the voice notification program 302d is set, and includes a normal volume value setting program, a first determination program, and a volume value change program. The normal volume value setting program is a program by which, when a voice message for output is designated, normal volume value data 304d is read out, a normal volume value set to the voice message for output is acquired, the normal volume value is set as an output volume value, and the output volume value data 304e corresponding to the output volume value is generated. The first determination program is a program by which, in a case where the output volume value is set in accordance with the normal volume value setting program, when a person is in the range of the person detection range A, whether to change the output volume value is determined. The volume value change program is a program by which, when it is determined that the output volume value is to be changed in accordance with the first determination program, the output volume value is changed in accordance with a content of the voice message for output and the output volume value data 304e is changed (updated).

Note that, although illustration will be omitted, for example, a program by which various functions are executed by the CPU 70 is also stored in the program storage region 302.

In the data storage region 304 of the RAM 74, operation input data 304a, the image generation data 304b, voice data 304c, the normal volume value data 304d, the output volume value data 304e, and the like are stored.

The operation input data 304a is touch coordinate data and/or operation data detected (acquired) in accordance with the operation detection program 302a. The detected touch coordinate data and/or operation data are/is stored in the data storage region 304 in time series.

The image generation data 304b is image data that includes, for example, polygon data and texture data which are used to generate display image data for various screens displayed on the display 50.

The voice data 304c is data about voice (synthesized voice) of a voice message corresponding to various kinds of information about use of the image forming apparatus 10. For example, when voice notification control starts, the voice data 304c is read out from the HDD 88 and stored in the data storage region 304 of the RAM 74.

The normal volume value data 304d is data about a normal volume value set to each of voice messages that are able to be output by the image forming apparatus 10.

The output volume value data 304e is data about the output volume value that is set in accordance with the volume setting program 302e. In a case where the output volume value is changed in accordance with the volume value change program, however, the output volume value data 304e is data about the changed output volume value.

Note that, although illustration will be omitted, in the data storage region 304, other data that is used to execute overall control processing of the image forming apparatus 10 is stored or a timer (counter) and a register that are used to execute the overall control processing are provided. Further, in the data storage region 304, a condition table in which a condition of an output is described for each of voice messages that are able to be output by the image forming apparatus 10 is also stored. In the image forming apparatus 10, whether to perform voice notification is determined in accordance with the condition described in the condition table.

Figure 5:
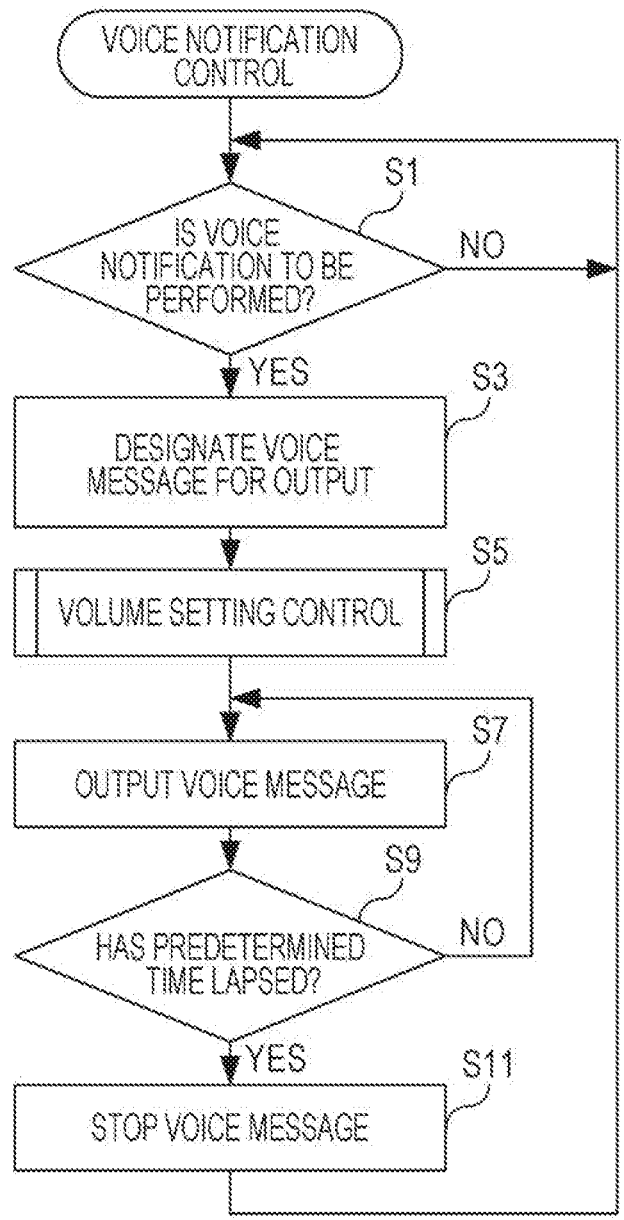
FIG. 5 is a flowchart of voice notification control of the CPU illustrated in FIG. 2.

FIG. 5 illustrates an example of a flowchart of voice notification control of the CPU 70 illustrated in FIG. 2. As illustrated in FIG. 5, upon start of the voice notification control, the CPU 70 determines whether to perform voice notification at step S1. Here, in accordance with the situation of the image forming apparatus 10, the CPU 70 determines whether to notify a person who uses the image forming apparatus 10 of a predetermined voice message.

When "NO" is given at step S1, that is, when it is determined that voice notification is not to be performed, the procedure returns to step S1. On the other hand, when "YES" is given at step S1, that is, when it is determined that voice notification is to be performed, a voice message for output is designated at step S3, volume setting control is performed at step S5, and then, at step S7, the voice message for output is output from the speaker 80 with a volume corresponding to an output volume value that is set under the volume setting control and a timer starts. Although illustration is omitted, the timer (counter) is provided in the RAM 74.

Subsequently, whether a predetermined time (for example, 1 minute) has lapsed is determined at step S9. When "NO" is given at step S9, that is, when the predetermined time has not lapsed, the procedure returns to step S7. When "YES" is given at step S9, that is, when the predetermined time has lapsed, the output of the voice message for output is stopped and the timer is reset at step S11, and the procedure returns to step S1. Note that, since a time during which the voice message is reproduced is several seconds, the voice message is repeatedly output until the predetermined time has lapsed thorough the processing of steps S7 and S9.

Figure 6:
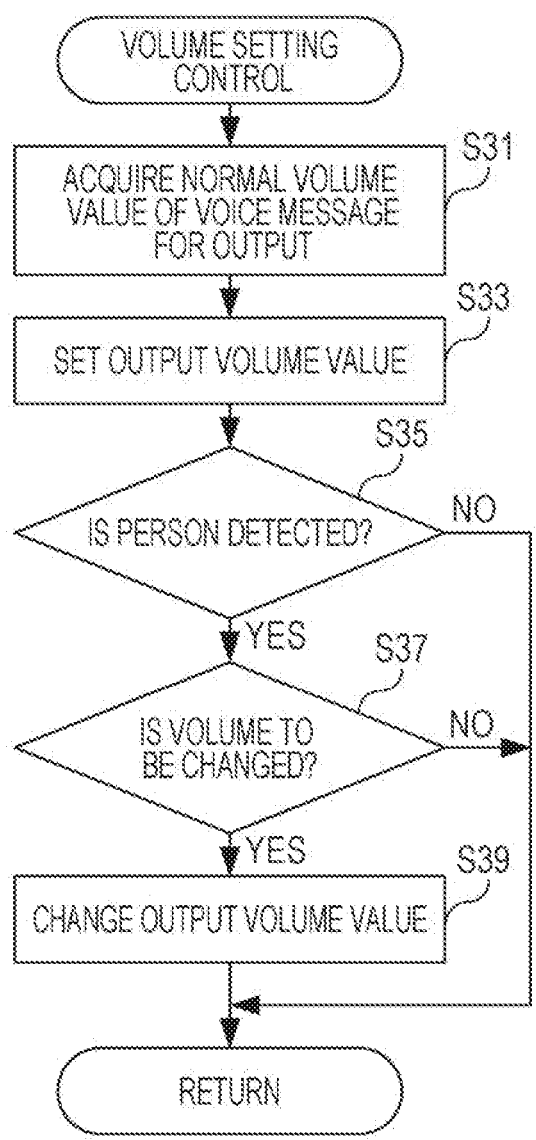
FIG. 6 is a flowchart of volume setting control of the CPU illustrated in FIG. 2.

FIG. 6 illustrates an example of a flowchart of volume setting control of the CPU 70. For example, the flowchart of the volume setting control is a sub-routine executed at step S5 of the voice notification control.

As illustrated in FIG. 6, upon start of the volume setting control, the CPU 70 acquires a normal volume value of a voice message for output at step S31. Here, the CPU 70 reads out the normal volume value data 304d stored in the RAM 74 and thereby acquires the normal volume value of the voice message for output.

Subsequently, the normal volume value of the voice message for output is set as an output volume value at step S33, and whether a person (object) is detected is determined at step S35. Here, the CPU 70 determines whether a person exists in the range of the person detection range A on the basis of an output of the person detection sensor 60.

When "NO" is given at step S35, that is, when a person is not detected, the procedure returns to the voice notification control. On the other hand, when "YES" is given at step S35, that is, when a person is detected, whether to change the output volume value is determined at step S37. Here, whether to change the output volume value is determined in accordance with a content of the voice message for output.

When "NO" is given at step S37, that is, when it is determined that the output volume value is not to be changed, the procedure returns to the voice notification control. When "NO" is given at step S35 and "NO" is given at step S37, at step S7 of the voice notification control, the voice message for output is output from the speaker 80 with a volume according to the output volume value set at step S33.

On the other hand, when "YES" is given at step S37, that is, when it is determined that the output volume value is to be changed, the output volume value is changed at step S39 and the procedure returns to the voice notification control. In this case, at step S7 of the voice notification control, the voice message for output is output from the speaker 80 with a volume according to the output volume value changed at step S39.

According to the embodiment, in accordance with a content of a message to be reproduced and whether a person is around the image forming apparatus 10, a volume in the reproduction is changed from a normal volume, so that notification by voice is able to be performed with an appropriate volume according to the situation around the apparatus.

Further, according to the embodiment, when it is determined that a person is around the image forming apparatus 10, the volume in the reproduction is reduced, so that it is possible to avoid a case where the message is harsh for the person near the apparatus.

Note that, though a message is repeatedly output until a predetermined time has lapsed in the first embodiment, the message may be output once.

Moreover, though a message is output in the first embodiment, predetermined sound or predetermined melody may be output instead of voice.

Modified Example

Further, though whether to change an output volume value in accordance with a content of a voice message for output is determined in accordance with the first determination program and the output volume value is changed in accordance with the volume value change program in the first embodiment, the output volume value may be set and changed in accordance with a volume table created in advance. FIG. 7 illustrates an example of a volume table in a modified example. Data of the volume table is stored in the RAM 74.

As illustrated in FIG. 7, in the volume table, a message content, a normal volume, and a volume when there is a person (volume in presence of a person) are described correspondingly to an ID (message ID) allocated to each of voice messages that are able to be output by the image forming apparatus 10.

The message ID is identification information to identify a voice message, and a number (message number) is given in ascending order to each of the voice messages, for example. The normal volume indicates whether a volume is large or small during output of the voice message when a person is not in the range of the person detection range A. The volume in presence of a person indicates whether a volume is large or small during output of the voice message when a person is in the range of the person detection range A. Note that, "large" and "small" indicated by the normal volume and the volume in presence of a person indicate a relative degree of the volume and a predetermined volume value is allocated to each of "large" and "small".

For example, a volume value allocated to "large" is set to a value by which even a person outside the range of the person detection range A is able to recognize the voice message. A volume value allocated to "small" is set to a value by which a person existing outside the range of the person detection range A is not able to recognize the voice message but a person in the range of the person detection range A is able to recognize the voice message. Further, the volume value allocated to "small" may be set to a value by which the person in the range of the person detection range A does not feel that the voice message is noisy. Note that, the volume values allocated to "large" and "small" are appropriately set in accordance with an environment where the image forming apparatus 10 is installed.

In the example illustrated in FIG. 7, a content of a voice message (voice message 1) to which a message number 1 is allocated is "Paper is jammed.", and for the voice message 1, the normal volume is set to "large" and the volume in presence of a person is set to "small". Similarly, for a voice message (voice message 2) to which a message number 2 is allocated, a voice message (voice message 3) to which a message number 3 is allocated, and a voice message (voice message 6) to which a message number 6 is allocated, the normal volume is set to "large" and the volume in presence of a person is set to "small". This is because contents of the voice messages indicate a voice message to perform notification of an error that is able to be handled even by a general user and a voice message to perform notification of an end of a job, and from a viewpoint of importance or urgency of the contents of the voice messages, when a person is not in the range of the person detection range A, it is requested that each of the voice messages also reaches a place at some distance from the image forming apparatus 10, but when a person is in the range of the person detection range A, it is only requested that the person is able to recognize the content of the voice message.

Moreover, a content of a voice message (voice message 4) to which a message number 4 is allocated is "Document is left. Please check.", and for the voice message 4, both the normal volume and the volume in presence of a person are set to "large". This is because a notification target of such a voice message having a content with high urgency is not necessarily a person in the range of the person detection range A, and also from a viewpoint of security, the voice message is to be notified immediately, so that the voice message is to be output with a large volume at all times.

Moreover, a content of a voice message (voice message 5) to which a message number 5 is allocated is "Document size is detected.", and for the voice message 5, both the normal volume and the volume in presence of a person are set to "small". This is because a notification target of such a voice message to make a response to an operation of the user is a person who operates the image forming apparatus 10, that is, a person in the range of the person detection range A, so that it is only requested that the person is able to recognize the voice message.

Note that, for convenience of description, "large" and "small" indicating the normal volume and the volume in presence of a person are described in the volume table illustrated in FIG. 7, but a numeral, a mark, or the like indicating a volume value may be described.

Further, for convenience of description, a content of a message is described correspondingly to a message ID in the volume table illustrated in FIG. 7, but a content of a message may not be described in the volume table.

In the image forming apparatus 10 of the modified example, when it is determined that voice notification is to be performed, a message ID of a voice message for output, which is to be output, is designated, a normal volume value corresponding to a normal volume of the voice message corresponding to the message ID is set as an output volume value in accordance with the volume table, and when a person is in the range of the person detection range A, a volume value when there is a person, which corresponds to a volume in presence of a person, is acquired, and when the output volume value is different from the volume value when there is a person, the output volume value is changed to the volume value when there is a person.

Figure 8:
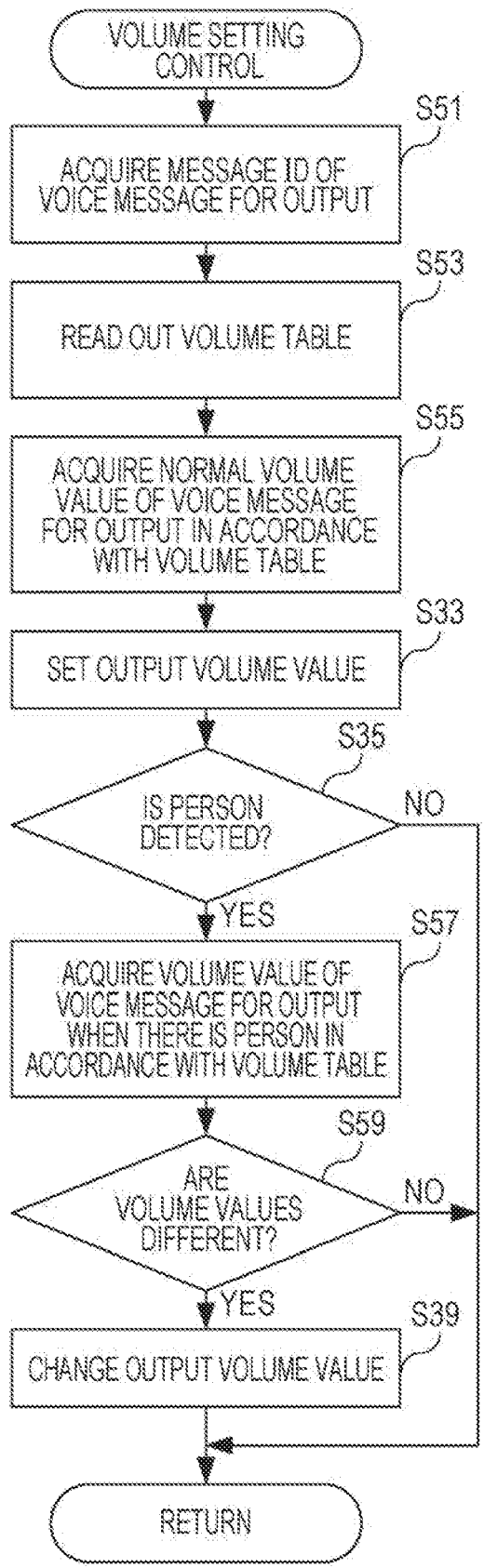
FIG. 8 is a flowchart of volume setting control in the modified example.

FIG. 8 is a flowchart of volume setting control in the modified example. Though the volume setting control in the modified example will be described below with reference to a flowchart, processing which is the same as that of the volume setting control described in the first embodiment will be given the same reference sign, and for a duplicate content, description will be omitted or brief description will be given.

As illustrated in FIG. 8, upon start of the volume setting control, the CPU 70 acquires a message ID of a voice message for output at step S51, reads out a volume table at step S53, acquires a normal volume value of the voice message for output in accordance with the volume table at step S55, and sets the normal volume value as an output volume value at step S33. Then, when "YES" is given at step S35, that is, when a person is detected, a volume value of the voice message for output when there is a person is acquired in accordance with the volume table at step S57, and whether a volume for output is different from the volume value when there is a person is determined at step S59. When "NO" is given at step S59, that is, when it is determined that the volume for output is the same as the volume value when there is a person, the procedure returns to the voice notification control. On the other hand, when "YES" is given at step S59, that is, when it is determined that the volume for output is different from the volume value when there is a person, the output volume value is changed at step S39 and the procedure returns to the voice notification control.

Second Embodiment

An image forming apparatus 10 of a second embodiment is the same as the image forming apparatus 10 of the first embodiment except that a content of volume setting control is partially different, so that duplicate description will be omitted.

In the second embodiment, in a case where a voice message for output is designated, when the voice message for output is not to be output in accordance with a relationship between a content of the voice message for output and an operation mode being executed in the image forming apparatus 10, an output volume value is set to zero. That is, the voice message is not output.

Note that, in the embodiment, the operation mode means a scan mode, a copy mode, a print mode, a fax mode, an electronic mail mode, or the like. Each of the modes corresponds to each of various jobs that are able to be executed by the image forming apparatus 10, and an operation of the user to execute a corresponding job is received and the job is executed in each of the modes.

For example, when the operation mode being executed in the image forming apparatus 10 is the copy mode, the output volume value is set to zero, for example, for a voice message about an error related to print, such as paper shortage, toner shortage, or paper jam, among voice messages to perform notification of an error.

Here, a message indicating that copy is not able to be executed and a message about an error related to print are displayed on the display 50. Thus, the messages displayed on the display 50 enable a person who operates the image forming apparatus 10, that is, a person who intends to execute copy to recognize that the error related to print occurs. Therefore, it is not necessary to perform notification by voice, so that the output volume value is set to zero.

Moreover, when the operation mode being executed in the image forming apparatus 10 is the scan mode, the fax mode (fax transmission mode), or the electronic mail mode, the output volume value is set to zero, for example, for a voice message about an error related to print among voice messages to perform notification of an error. Here, even when the error related to print is not resolved, scan, transmission of a fax, or transmission of an electronic mail is able to be executed. Thus, it is not necessary to actively notify a person who operates the image forming apparatus 10, that is, a person who intends to execute scan, transmission of a fax, or transmission of an electronic mail, of the occurrence of the error related to print. Therefore, the output volume value is set to zero. Note that, since a message about the error related to print is displayed on the display 50, the person who operates the image forming apparatus 10 is able to recognize that the error related to print occurs.

On the other hand, when the voice message for output is to be output in accordance with a relationship between a content of the voice message for output and the operation mode being executed in the image forming apparatus 10, an output volume value is set by a method similar to that of the first embodiment.

Moreover, in the second embodiment, to realize the operation as described above, the information processing program stored in the RAM 74 of the image forming apparatus 10 includes a second determination program or the like by which, when a voice message for output is designated, whether to output the voice message for output is determined in accordance with a relationship between a content of the voice message for output and an operation mode being executed in the image forming apparatus 10.

Further, in the second embodiment, the volume setting program 302e is also a program by which, when the second determination program determines that the voice message for output is not to be output, the output volume value is set to zero.

Though volume setting control in the second embodiment will be described below with reference to a flowchart, processing which is the same as that of the volume setting control described in the first embodiment will be given the same reference sign, and for a duplicate content, description will be omitted or brief description will be given.

Figure 9:
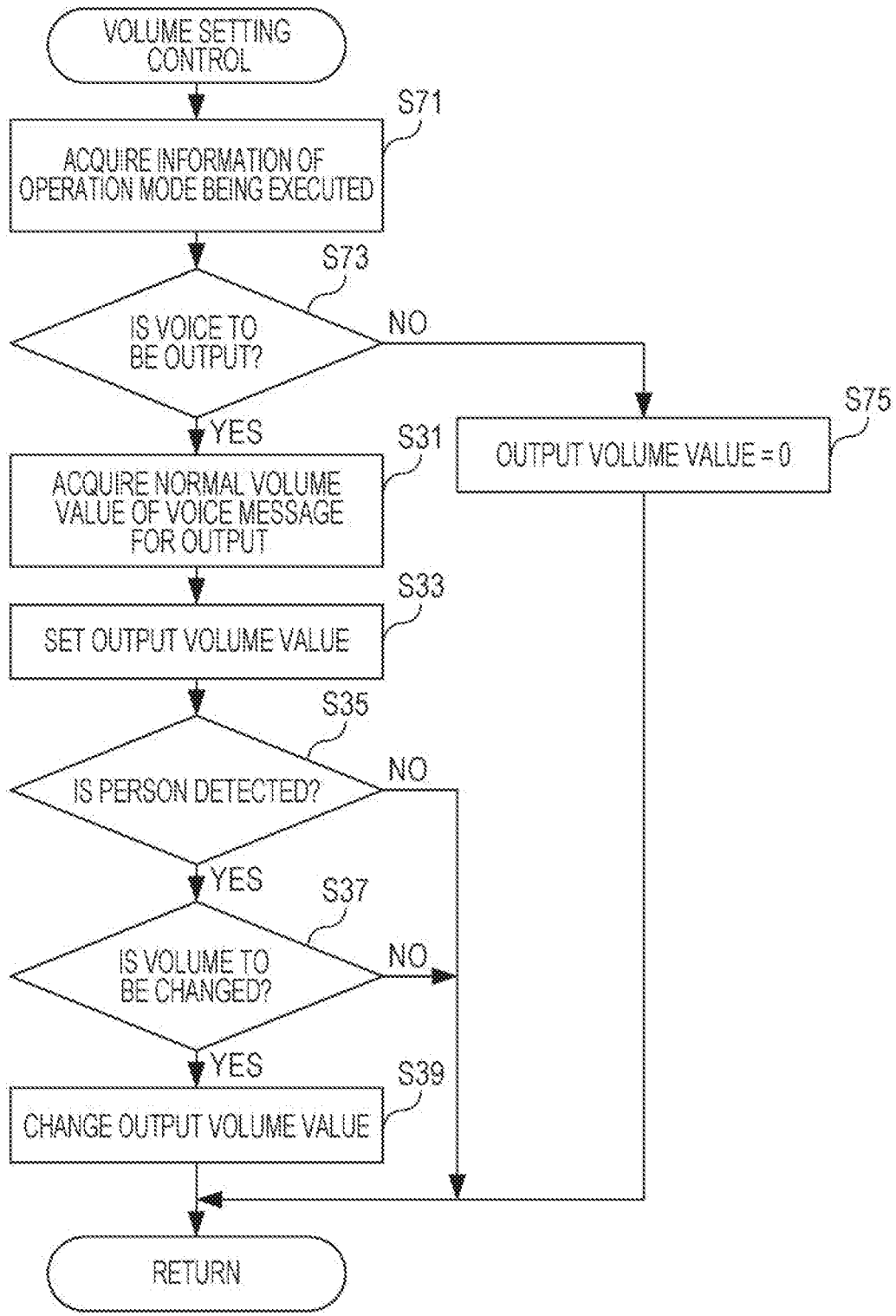
FIG. 9 is a flowchart of volume setting control of the CPU in a second embodiment.

FIG. 9 is a flowchart of volume setting control of the CPU 70 in the second embodiment. As illustrated in FIG. 9, upon start of the volume setting control, the CPU 70 acquires information about an operation mode being executed in the image forming apparatus 10 at step S71 and determines whether to output a voice message for output at step S73. Here, whether to output the voice message for output is determined in accordance with a relationship between a content of the voice message for output and the operation mode being executed in the image forming apparatus 10.

When "YES" is given at step S73, that is, when it is determined that the voice message for output is to be output, the procedure proceeds to step S31. On the other hand, when "NO" is given at step S73, that is, when it is determined that the voice message for output is not to be output, an output volume value is set to zero at step S75 and the procedure returns to the voice notification control.

According to the embodiment, when a voice message for output is not to be output in accordance with a relationship between a content of the voice message for output and an operation mode being executed in the image forming apparatus 10, an output volume value is set to zero, so that it is possible to appropriately perform voice notification in accordance with a using situation of the apparatus.

Note that, whether to output a voice message for output is determined in accordance with the second determination program in the second embodiment, but in a case where a table in which information about whether to output a voice message for output is described exists instead of the second determination program, the voice message may be output or may not be output in accordance with a content of the table.

Third Embodiment

An image forming apparatus 10 of a third embodiment is the same as the image forming apparatus 10 of the first embodiment except that a content of volume setting control is partially different, so that duplicate description will be omitted.

In the third embodiment, in a case where user authentication is performed and an operator (registered user) allowed to login operates the image forming apparatus 10, upon designation of a voice message for output, when the voice message for output is not to be output in accordance with a relationship between a content of the voice message for output and the registered user, an output volume value is set to zero. That is, the voice message is not output.

For example, in a case where a certain registered user operates the image forming apparatus 10, the output volume value is set to zero, for example, for a voice message about an error related to print, which is generated in a print job instructed by another user, among voice messages to perform notification of an error.

Here, in a case where the registered user who is logged in intends to execute copy, a message indicating that copy is not able to be executed and a message about an error related to print are displayed on the display 50. Thus, the messages displayed on the display 50 enable the registered user to recognize that the error related to print occurs. Therefore, it is not necessary to perform notification by voice, so that the output volume value is set to zero.

Further, in a case where the registered user who is logged in intends to execute scan, transmission of a fax, transmission of an electronic mail, or the like, a job thereof is able to be executed even when the error related to print is not resolved. Thus, since it is not necessary to actively notify the registered user of the occurrence of the error related to print, the output volume value is set to zero. However, since the message about the error related to print is displayed on the display 50, a person who operates the image forming apparatus 10 is able to recognize that the error related to print occurs.

On the other hand, in a case where a voice message for output is to be output in accordance with a relationship between a content of the voice message for output and the registered user who is logged in, the output volume value is set by a method similar to that of the first embodiment.

Moreover, in the third embodiment, to realize the operation as described above, the information processing program stored in the RAM 74 of the image forming apparatus 10 includes a third determination program or the like by which, when a voice message for output is designated, whether to output the voice message for output is determined in accordance with a relationship between a content of the voice message for output and a registered user.

Further, in the third embodiment, the volume setting program 302e is also a program by which, when the third determination program determines that the voice message for output is not to be output, the output volume value is set to zero.

Though volume setting control in the third embodiment will be described below with reference to a flowchart, processing which is the same as that of the volume setting control described in the first embodiment will be given the same reference sign, and for a duplicate content, description will be omitted or brief description will be given.

Figure 10:
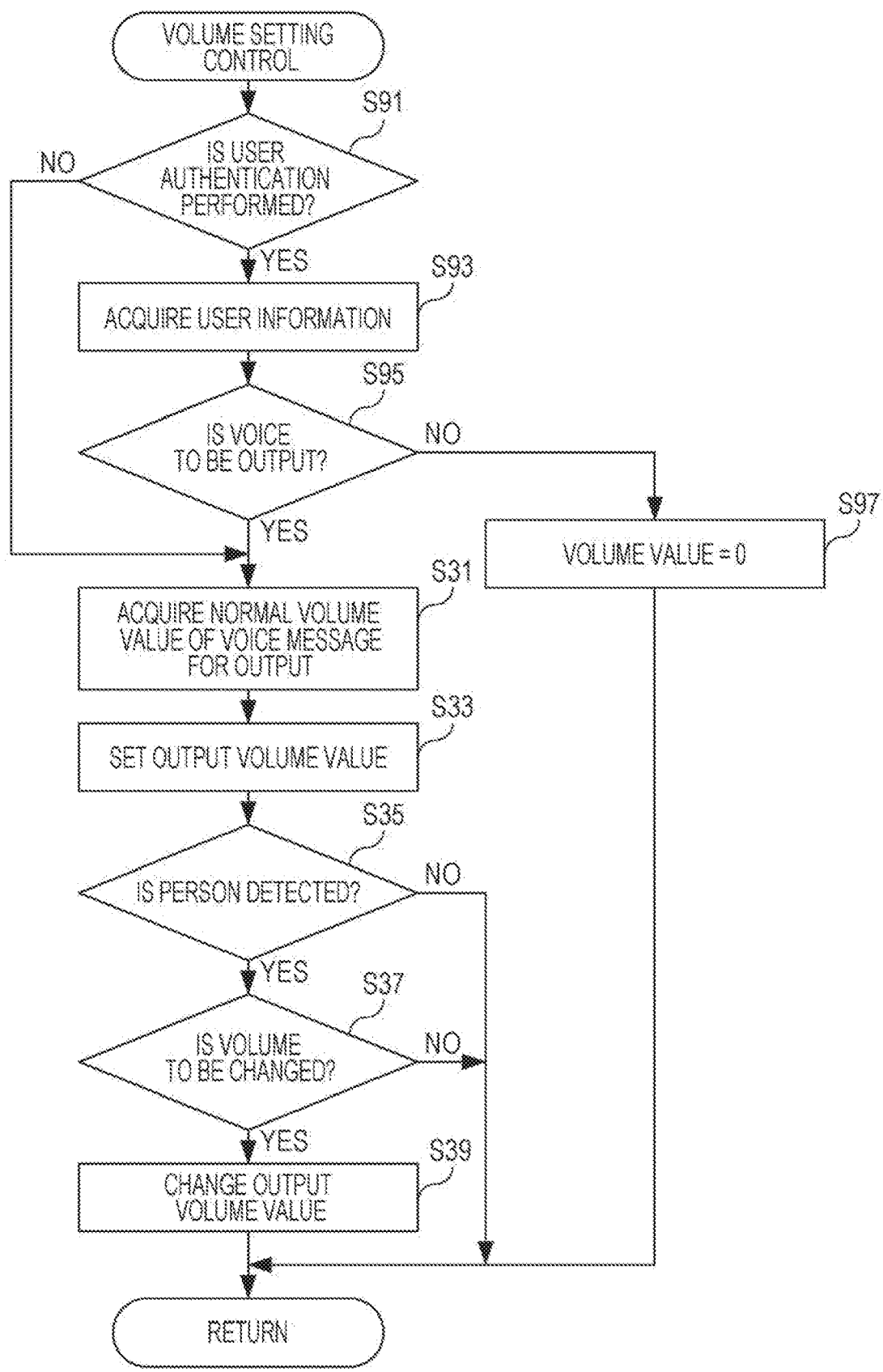
FIG. 10 is a flowchart of volume setting control of the CPU in a third embodiment.

FIG. 10 is a flowchart of volume setting control of the CPU 70 in the third embodiment. As illustrated in FIG. 10, upon start of the volume setting control, the CPU 70 determines whether user authentication is performed at step S91. When "NO" is given at step S91, that is, when the user authentication is not performed, the procedure proceeds to step S31. On the other hand, when "YES" is given at step S91, that is, when the user authentication is performed, user information of a registered user who is logged in is acquired at step S93, and whether to output a voice message for output is determined at step S95. Here, whether to output the voice message for output is determined in accordance with a relationship between a content of the voice message for output and the registered user.

When "YES" is given at step S95, that is, when it is determined that the voice message for output is to be output, the procedure proceeds to step S31. On the other hand, when "NO" is given at step S95, that is, when it is determined that the voice message for output is not to be output, an output volume value is set to zero at step S97 and the procedure returns to the voice notification control.

According to the embodiment, in a case where user authentication is performed and a registered user operates the image forming apparatus 10, when a voice message for output is not to be output in accordance with a relationship between a content of the voice message for output and the registered user, an output volume value is set to zero, so that it is possible to appropriately perform voice notification in accordance with the user who operates the apparatus.

Note that, whether to output a voice message for output is determined in accordance with the third determination program in the third embodiment, but in a case where a table in which information about whether to output a voice message for output is described exists instead of the third determination program, the voice message may be output or may not be output in accordance with a content of the table.

Fourth Embodiment

An image forming apparatus 10 of a fourth embodiment is the same as the image forming apparatus 10 of the first embodiment except that a content of volume setting control is partially different, so that duplicate description will be omitted.

In some conventional image forming apparatuses, when there are a plurality of pieces of information to be notified by voice and there is a difference of importance or urgency therebetween, a volume of the voice to be reproduced is changed in accordance with importance or urgency of information to be notified.

In the conventional image forming apparatuses, however, although the information to be notified has been already recognized by a user, the voice is output with a large volume in some cases depending on an operation mode being executed by the image forming apparatus 10. In such a case, there is a problem that the voice is harsh for the user.

Thus, the image forming apparatus 10 of the fourth embodiment is configured so that a volume value in output is changed from a normal volume value, which is set to each of voice messages, in accordance with a relationship between a content of a voice message for output and an operation mode being executed in the image forming apparatus 10.

Specifically, when a voice message for output is designated, a normal volume value set to the voice message for output is set as an output volume value, and subsequently, whether to change the output volume value is determined in accordance with a relationship between a content of the voice message for output and an operation mode being executed in the image forming apparatus 10.

For example, when the operation mode being executed in the image forming apparatus 10 is the copy mode, the output volume value is changed to a volume value smaller than the normal volume value, for example, for a voice message about an error related to print, such as paper shortage, toner shortage, or paper jam, among voice messages to perform notification of an error. That is, the output volume value is changed from a value by which even a person existing outside the range of the person detection range A is able to recognize the voice message to a value by which the person existing outside that range of the person detection range A is not able to recognize the voice message but a person in the range of the person detection range A is able to recognize the voice message.

Here, a message indicating that copy is not able to be executed and a message about an error related to print are displayed on the display 50. Thus, the messages displayed on the display 50 enable a person who operates the image forming apparatus 10, that is, a person who intends to execute copy to recognize that the error related to print occurs, so that it is not necessary to output the voice message with a large volume. Thus, the output volume value is changed to a volume value smaller than the normal volume value.

Moreover, when the operation mode being executed in the image forming apparatus 10 is the scan mode, the fax mode, or the electronic mail mode, the output volume value is changed to a volume value smaller than the normal volume value, for example, for a voice message about an error related to print among voice messages to perform notification of an error. That is, the output volume value is changed from a value by which even a person existing outside the range of the person detection range A is able to recognize the voice message to a value by which the person existing outside that range of the person detection range A is not able to recognize the voice message but a person in the range of the person detection range A is able to recognize the voice message.

Here, even when the error related to print is not resolved, scan, transmission of a fax, or transmission of an electronic mail is able to be executed. Thus, it is not necessary to actively notify a person who intends to execute scan, transmission of a fax, or transmission of an electronic mail of the occurrence of the error related to print. Thus, the output volume value is changed to a volume value smaller than the normal volume value.

Moreover, in the fourth embodiment, to realize the operation as described above, the first determination program included in the volume setting program 302e is a program by which, when an output volume value is set, whether to change the output volume value is determined in accordance with a relationship between a content of a voice message for output and an operation mode being executed in the image forming apparatus 10. Further, the volume value change program included in the volume setting program 302e is a program by which, when it is determined that the output volume value is to be changed in accordance with the first determination program, the output volume value is changed in accordance with a relationship between the content of the voice message for output and the operation mode being executed in the image forming apparatus 10 and the output volume value data 304e is changed.

Though volume setting control in the fourth embodiment will be described below with reference to a flowchart, processing which is the same as that of the volume setting control described in the first embodiment will be given the same reference sign, and for a duplicate content, description will be omitted or brief description will be given.

Figure 11:
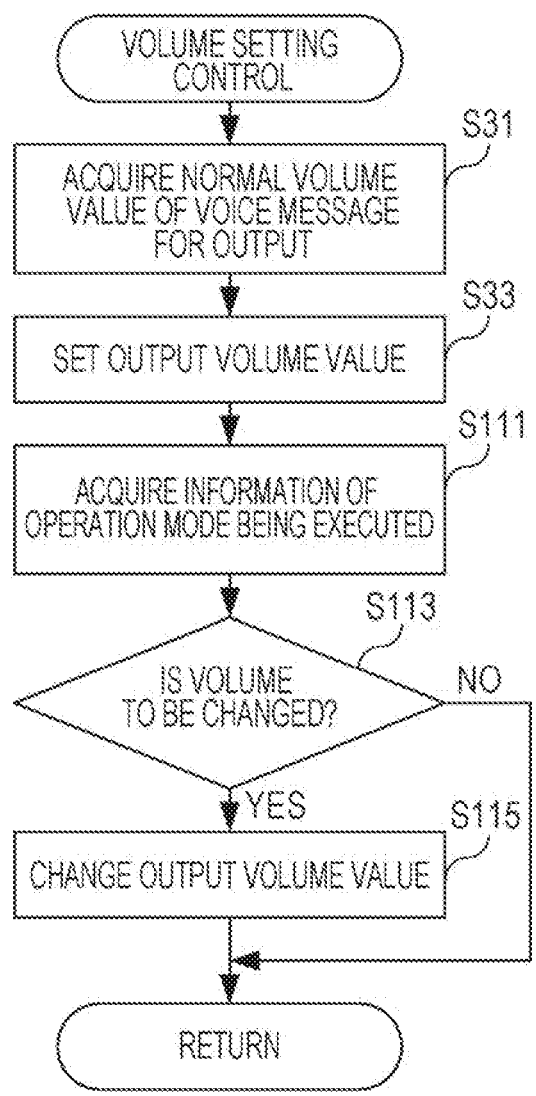
FIG. 11 is a flowchart of volume setting control of the CPU in a fourth embodiment.

FIG. 11 is a flowchart of volume setting control of the CPU 70 in the fourth embodiment. As illustrated in FIG. 11, upon start of the volume setting control, the CPU 70 sets a normal volume value of a voice message for output as an output volume value at step S33, acquires information about an operation mode being executed in the image forming apparatus 10 at step S111, and determines whether to change the output volume value in accordance with a relationship between a content of the voice message for output and the operation mode being executed in the image forming apparatus 10 at step S113.

When "NO" is given at step S113, that is, when it is determined that the output volume value is not to be changed, the procedure returns to the voice notification control. On the other hand, when "YES" is given at step S113, that is, when it is determined that the output volume value is to be changed, the output volume value is changed at step S115 and the procedure returns to the voice notification control.

According to the embodiment, in accordance with a relationship between a content of a voice message for output and an operation mode being executed in the image forming apparatus 10, a volume value in output of the voice message is changed from a normal volume, so that it is possible to appropriately perform voice notification in accordance with a using situation of the apparatus.

Fifth Embodiment

An image forming apparatus 10 of a fifth embodiment is the same as the image forming apparatus 10 of the first embodiment except that a content of volume setting control is partially different, so that duplicate description will be omitted.

In some conventional image forming apparatuses, when there are a plurality of pieces of information to be notified by voice and there is a difference of importance or urgency therebetween, a volume of the voice to be reproduced is changed in accordance with importance or urgency of information to be notified.

In the conventional image forming apparatuses, however, in a case where user authentication is executed and a registered user who is allowed to login operates the image forming apparatus 10, voice of a voice message generated by a job instructed by another user is also output with a large volume in some cases. In such a case, there is a problem that the voice is harsh for the user.

Thus, the image forming apparatus 10 of the fifth embodiment is configured so that, when a registered user operates the image forming apparatus 10, a volume value in output is changed from a normal volume value, which is set to each of voice messages, in accordance with a relationship between a content of a voice message for output and the registered user.

For example, when a certain registered user operates the image forming apparatus 10, the output volume value is changed to a volume value smaller than the normal volume value, for example, for a voice message about an error which relates to print and is caused by a print job instructed by another user among voice messages to perform notification of an error. That is, the output volume value is changed from a value by which even a person existing outside the range of the person detection range A is able to recognize the voice message to a value by which the person existing outside that range of the person detection range A is not able to recognize the voice message but a person in the range of the person detection range A is able to recognize the voice message.

Here, in a case where the registered user who is logged in intends to execute copy, a message indicating that copy is not able to be executed and a message about an error related to print are displayed on the display 50. Thus, the messages displayed on the display 50 enable the registered user to recognize that the error related to print occurs, so that it is not necessary to output the voice message with a large volume. Thus, the output volume value is changed to a volume value smaller than the normal volume value as described above.

Further, in a case where the registered user who is logged in intends to execute scan, transmission of a fax, transmission of an electronic mail, or the like, scan, transmission of a fax, transmission of an electronic mail, or the like is able to be executed even when the error related to print is not resolved. Thus, since it is not necessary to actively notify the registered user of the occurrence of the error related to print, the output volume value is changed to a volume value smaller than the normal volume value as described above.

Further, the output volume value is changed to a volume value smaller than the normal volume value, for example, for a voice message about an error which relates to print and is caused by a job instructed by the registered user who is logged in. This is because it is only requested that the registered user is able to recognize a content of the voice message.

In addition, how to change an output volume value may be set in advance for each of registered users who are logged in. For example, in a case of a user who feels that a voice message is harsh, the output volume value may be changed to a volume value smaller than the normal volume value regardless of a content of a voice message for output. Further, in a case of a user having difficulty in hearing sound, the output volume value may be changed to a volume value larger than the normal volume value regardless of a content of a voice message for output.

Moreover, in the fifth embodiment, to realize the operation as described above, the first determination program included in the volume setting program 302e is a program by which, when an output volume value is set, whether to change the output volume value is determined in accordance with a relationship between a content of a voice message for output and a registered user. Further, the volume value change program included in the volume setting program 302e is a program by which, when it is determined that the output volume value is to be changed in accordance with the first determination program, the output volume value is changed in accordance with a relationship between the content of the voice message for output and the registered user and the output volume value data 304e is changed.

Though volume setting control in the fifth embodiment will be described below with reference to a flowchart, processing which is the same as that of the volume setting control described in the first embodiment will be given the same reference sign, and for a duplicate content, description will be omitted or brief description will be given.

Figure 12:
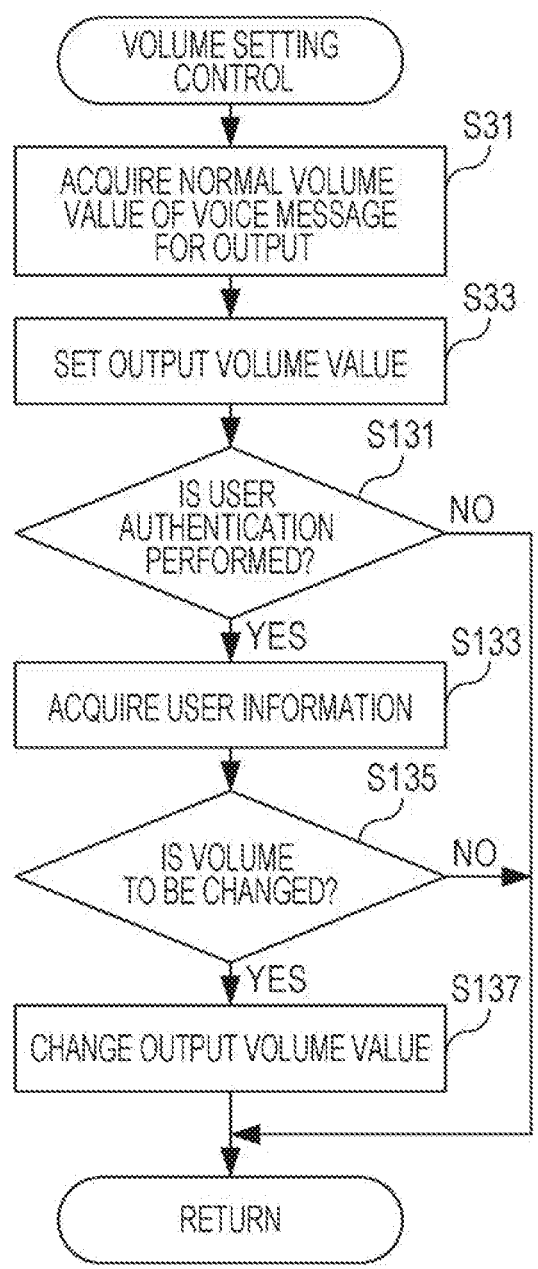
FIG. 12 is a flowchart of volume setting control of the CPU in a fifth embodiment.

FIG. 12 is a flowchart of volume setting control of the CPU 70 in the fifth embodiment. As illustrated in FIG. 12, upon start of the volume setting control, the CPU 70 sets a normal volume value of a voice message for output as an output volume value at step S33, and determines whether user authentication is performed at step S131. When "NO" is given at step S131, that is, when the user authentication is not performed, the procedure returns to the voice notification control. On the other hand, when "YES" is given at step S131, that is, when the user authentication is performed, user information of a registered user who is logged in is acquired at step S133, and whether to change the output volume value is determined in accordance with a relationship between a content of the voice message for output and the registered user at step S135. When "NO" is given at step S135, that is, when it is determined that the output volume value is not to be changed, the procedure returns to the voice notification control. On the other hand, when "YES" is given at step S135, that is, when it is determined that the output volume value is to be changed, the output volume value is changed at step S137 and the procedure returns to the voice notification control.

According to the embodiment, in accordance with a relationship between a content of a voice message for output and a registered user, a volume value in output of the voice message is changed from a normal volume, so that it is possible to appropriately perform voice notification in accordance with the user who operates the apparatus.

Sixth Embodiment

An image forming apparatus 10 of a sixth embodiment is the same as the image forming apparatus 10 of the first embodiment except that a content of voice notification control is partially different, so that duplicate description will be omitted.

In the sixth embodiment, whether or not to effect suspension designation is set to each of voice messages that are able to be output by the image forming apparatus 10. Note that, the suspension means that an output of the voice message is suspended when it is determined that a person exists in the range of the person detection range A. That is, a voice message in which the suspension designation is "effected" is not output when it is determined that a person exists in the range of the person detection range A. On the other hand, a voice message in which the suspension designation is "not effected" is output even when it is determined that a person exists in the range of the person detection range A.

For example, for a voice message to perform notification of information not to be notified immediately, a voice message to notify a person (another person) other than a person who operates the image forming apparatus 10 of information, and a voice message to perform notification of an error that is not able to be handled by a general user, the suspension designation is set to "effected".

The voice message to perform notification of information not to be notified immediately is suspended because, when such a voice message is output in a state where a person who operates the image forming apparatus 10 exists, the voice message may make the person feel annoyed. Moreover, the voice message to notify another person of information is suspended because, when such a voice message is output in a state where a person who operates the image forming apparatus 10 exists, the person who operates the image forming apparatus 10 may misunderstand that the voice message is notified to himself or herself. Further, the voice message to perform notification of an error that is not able to be handled by a general user is suspended because the output of such a voice message in a state where the general user operates the image forming apparatus 10 is not only meaningless but also confusing the user.

In the sixth embodiment, when a voice message for output is designated, whether or not to effect the suspension designation of the voice message for output is determined. When the suspension designation of the voice message for output is "not effected", similarly to the first embodiment, an output volume value is set or changed, and the voice message for output is output from the speaker 80 with a volume according to the output volume value.

On the other hand, in a case where the suspension designation of the voice message for output is "effected", the output is suspended while it is determined that a person exists in the range of the person detection range A, and then, when it is determined that a person does not exist in the range of the person detection range A, the voice message for output is output from the speaker 80.

Moreover, even in a case where the suspension designation of the voice message for output is "effected", when it is determined that a person does not exist in the range of the person detection range A, the output of the voice message for output is not suspended.

Further, in the sixth embodiment, to realize the operation as described above, to each of a plurality of voice messages included in the voice data 304c, data indicating whether or not to effect the suspension designation of the voice message is linked. Furthermore, in the sixth embodiment, the information processing program stored in the RAM 74 of the image forming apparatus 10 includes a fourth determination program or the like by which whether or not to effect the suspension designation of a voice message for output is determined.

Though volume notification control in the sixth embodiment will be described below with reference to a flowchart, processing which is the same as that of the volume notification control described in the first embodiment will be given the same reference sign, and for a duplicate content, description will be omitted or brief description will be given.

Figure 13:
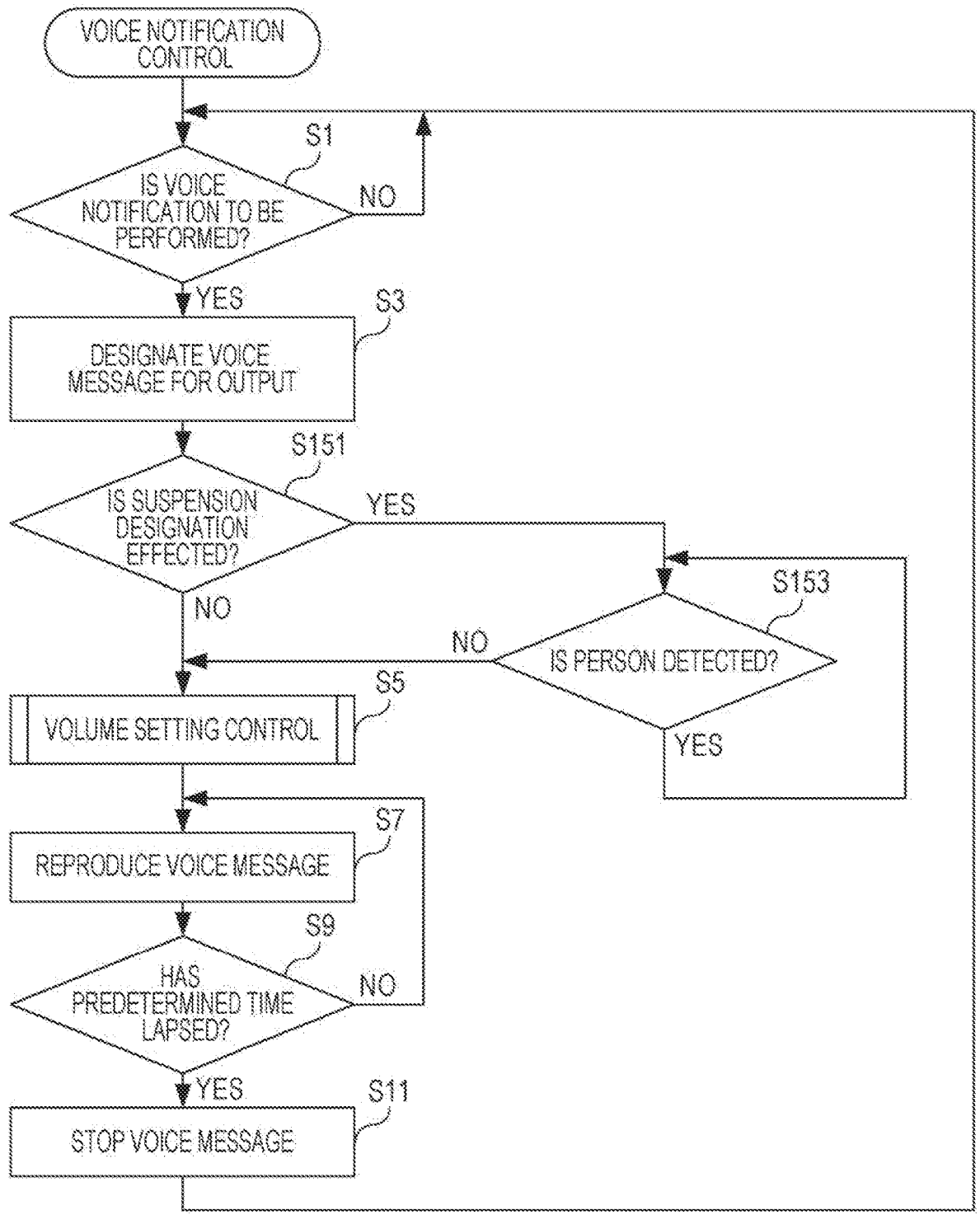
FIG. 13 is a flowchart of voice notification control of the CPU in a sixth embodiment.

FIG. 13 is a flowchart of voice notification control of the CPU 70 in the sixth embodiment. As illustrated in FIG. 13, upon start of the voice notification control, a voice message for output is designated at step S3, and whether or not to effect the suspension designation of the voice message for output is determined at step S151. When "YES" is given at step S151, that is, when it is determined that the suspension designation of the voice message for output is to be effected, whether a person is detected is determined at step S153. When "YES" is given at step S153, that is, when a person is detected, the procedure returns to the same step S153. On the other hand, when "NO" is given at step S153, that is, when a person is not detected, the procedure proceeds to step S5.

Further, when "NO" is given at step S151, that is, when it is determined that the suspension designation of the voice message for output is not to be effected, the procedure proceeds to step S5.

According to the embodiment, a voice message with a content not to be notified to a person around the image forming apparatus 10, for example, a person who operates the image forming apparatus 10 is output after the person leaves from the front of the image forming apparatus 10, so that it is possible to appropriately perform voice notification.

Note that, an aspect indicated in the sixth embodiment is able to be adopted in combination with any embodiment of the second embodiment through the fifth embodiment.

Further, in the sixth embodiment, in a case where an output of a voice message for output is suspended, when it is determined that a person does not exist in the range of the person detection range A, the voice message for output is output from the speaker 80, but the voice message for output may be output when a predetermined time has lapsed after it is determined that a person does not exist in the range of the person detection range A. Thereby, the voice message for output is output after the person in the range of the person detection range A is sufficiently apart from the image forming apparatus 10, so that it is possible to appropriately perform voice notification.

Processing order of the respective steps of the flowchart indicated in each of the embodiments described above is able to be appropriately changed as long as the same result is obtained.

Further, all specific configurations described in the present specification are merely examples, and are able to be appropriately changed in accordance with specification of an actual product. For example, voice notification processing described in the embodiments is also able to be executed in a printing apparatus (image forming unit 12), a facsimile apparatus, a scanner (image reading unit 14), or an image forming apparatus integrally provided with any two apparatuses among them, each of which has a voice output function.

Furthermore, any of a normal volume value and a volume value when a person is in the range of the person detection range A that are set to each of voice messages, a volume value according to an operation mode which is being executed, and a volume value according to a relationship with a registered user may be set.

In addition, the image forming apparatus 10 may further include a sound sensor such as a microphone. The sound sensor is connected to the CPU 70 and principally used to detect a noise level around the image forming apparatus 10. In a case where the image forming apparatus 10 has a voice recognition function, however, the sound sensor may be used also to receive a voice input of a user. In this case, in the image forming apparatus 10, an output volume value is changed in accordance with the noise level around the image forming apparatus 10, which is detected in accordance with an output of the sound sensor. Specifically, as the noise level around the image forming apparatus 10 is high, that is, as noise around the image forming apparatus 10 is large, the output volume value is changed to a larger volume value. This is because it becomes difficult to hear a voice message due to the noise around the image forming apparatus 10. Thereby, it is possible to appropriately perform voice notification in accordance with the situation around the apparatus.

Though setting of the output volume value and changing of the output volume value are executed by the CPU 70 of the image forming apparatus 10 in the embodiments described above, setting of the output volume value and changing of the output volume value may be executed by a processor of an external computer connected via the communication circuit 92, a processor of a computer on a cloud (hereinafter, collectively referred to as an "external processor" in some cases), or the like. In this case, when a voice message for output is designated, the CPU 70 of the image forming apparatus 10 transmits, to the external processor, data about the voice message for output and data about whether a person is in the range of the person detection range A. Note that, the data about the voice message for output may include at least identification information of the voice message for output when the external processor is allowed to access the data about a content of the voice message for output, and may include information about the content of the voice message for output when the external processor is not allowed to access the data about the content of the voice message for output.

When receiving the information about the voice message for output, the external processor sets a normal volume value, which is set to the voice message for output, as the output volume value in accordance with a program similar to the normal volume value setting program described above. Subsequently, on the basis of the information about whether a person is in the range of the person detection range A, the external processor determines whether to change the output volume value on the basis of the content of the voice message for output in accordance with a program similar to the first determination program described above. When determining that the output volume value is not to be changed, the external processor does not change the output volume value and transmits data about the output volume value to the image forming apparatus 10. Alternatively, when determining that the output volume value is to be changed, the external processor changes the output volume value on the basis of the content of the voice message for output in accordance with a program similar to the volume value change program described above and transmits data about the changed output volume value to the image forming apparatus 10.

The image forming apparatus 10 receives the data about the output volume value and outputs the voice message for output from the speaker 80 with a volume according to the output volume value indicated by the data. Note that, the external computer or the computer on the cloud may be a computer or a computer system that has a model having a learning function, so-called artificial intelligence (AI). The artificial intelligence generally has a learning function to achieve an intelligent function such as reasoning and determination, and thus allows setting of a more appropriate output volume value as the number of times of usage increases.

The present disclosure contains subject matter related to that disclosed in Japanese Priority Patent Application JP 2018-152001 filed in the Japan Patent Office on Aug. 10, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus including an output device that outputs voice, the image forming apparatus comprising:
    a notifier that causes the output device to output, out of a plurality of messages indicating information about use of the image forming apparatus, a message for output, which is selected in accordance with a using situation of the image forming apparatus, by voice;
    a volume setter that sets, in accordance with a content of the message for output, a volume when the message for output is output by voice;
    a person detector that detects whether a person exists in a predetermined region that is set to the image forming apparatus;

a first processor that determines, in accordance with the using situation of the image forming apparatus and the content of the message for output, whether to output the message for output by voice, a volume changer that changes, in accordance with a detection result of the person detection unit, the volume set by the volume setter, and in a case where the first processor determines that the message for output is not to be output by voice, the voice changer sets the volume, which is set by the volume setter, to zero.

2. The image forming apparatus according to claim 1, wherein in a case where the person detector determines that a person exists in the predetermined region, the volume changer reduces the volume set by the volume setter.

3. The image forming apparatus according to claim 1, wherein the using situation of the image forming apparatus includes an operation mode of the image forming apparatus when the message for output is output, and in accordance with a relationship between the operation mode of the image forming apparatus when the message for output is output and the content of the message for output, the first processor determines whether to output the message for output by voice.

4. The image forming apparatus according to claim 1, further comprising an authentication processor that performs user authentication processing for a person who intends to use the image forming apparatus and that permits login for a registered user registered in advance, wherein in a case where login succeeds in the user authentication processing, the first processor determines, in accordance with a relationship between the registered user who is allowed to login and the content of the message for output, whether to output the message for output by voice.

5. The image forming apparatus according to claim 1, further comprising a second processor that determines, in a case where the person detector determines that a person exists in the predetermined region, whether to suspend an output of the message for output, wherein in a case where the second processor determines that the output of the message for output is to be suspended, the notifier suspends the output of the message for output, and in a case where the person detection device determines that a person does not exist in the predetermined region after the output of the message for output is suspended, the notifier causes the output device to output the message for output that is suspended by voice.

6. The image forming apparatus according to claim 1, further comprising a noise detector that detects a noise level around the image forming apparatus, wherein in accordance with the noise level detected by the noise detector, the volume changer changes the volume set by the volume setter.

7. A non-transitory computer readable storage medium storing a control program executed by an image forming apparatus including an output device that outputs voice, wherein the control program causes a processor of the image forming apparatus to execute:

causing the output device to output, out of a plurality of messages indicating information about use of the image forming apparatus, a message for output, which is selected in accordance with a using situation of the image forming apparatus, by voice;

setting, in accordance with a content of the message for output, a volume when the message for output is output by voice;

detecting whether a person exists in a predetermined region that is set to the image forming apparatus;

changing, in accordance with a detection result of the detecting, the volume set by the setting;

determining, in accordance with the using situating of the image forming apparatus and the content of the message for output, whether to output the message for output by voice; and setting the volume to zero in a case where the first processor determines that the message for output is not to be output by voice.

8. A control method of an image forming apparatus including an output device that outputs voice, the control method comprising:

causing the output device to output, out of a plurality of messages indicating information about use of the image forming apparatus, a message for output, which is selected in accordance with a using situation of the image forming apparatus, by voice;

setting, in accordance with a content of the message for output, a volume when the message for output is output by voice;

detecting whether a person exists in a predetermined region that is set to the image forming apparatus;

changing, in accordance with a detection result of the detecting, the volume set by the setting;

determining, in accordance with the using situation of the image forming apparatus and the content of the message for output, whether to output the message for output by voice; and setting the volume to zero in a case where the first processor determines that the message for output is not to be output by voice.

* * * * *